United States Patent [19]
Smith et al.

[11] 3,862,799
[45] Jan. 28, 1975

[54] CONTROLLED-READING DEVICE

[75] Inventors: Elliott P. Smith, Wilmington, Del.;
Robert H. Wachsmuth, Elkins Park, Pa.

[73] Assignee: McGraw-Hill, Inc., New York, N.Y. by said Elliott P. Smith

[22] Filed: Jan. 15, 1973

[21] Appl. No.: 323,968

[52] U.S. Cl. .................... 353/88, 35/35 B, 351/31, 352/207, 353/97, 354/246
[51] Int. Cl. ..................... G03b 21/14, G03b 9/40
[58] Field of Search ............ 95/55; 35/356; 351/31; 352/204, 207; 353/88, 97; 354/345, 246

[56] References Cited
UNITED STATES PATENTS

| | | | |
|---|---|---|---|
| 2,933,027 | 4/1960 | Hollingworth et al. | 95/55 |
| 3,179,004 | 4/1965 | Storanoff et al. | 35/35 B |
| 3,502,406 | 3/1970 | Macombet | 35/35 B |

Primary Examiner—Harry N. Haroian
Assistant Examiner—Steven L. Stephan
Attorney, Agent, or Firm—Dorfman, Herrell and Skillman

[57] ABSTRACT

A film cassette is provided with a continuous loop of film. One intermediate run of the film is twisted approximately 90° about its longitudinal axis and is passed between guides holding the film in a plane perpendicular to and on center with the lens axis. The cassette is provided with a predetermined cross-section and a guide in the projector frame for receiving the cassette is so shaped that its cross-sectional form will determine a unique orientation for the cassette within the guide.

The projector is provided with a movable opaque slide having an aperture through which only a portion of the line may be projected and which is moved along guide means to enable successive portions of the entire line to be viewed in reading sequence. Preferably a shutter is movably supported by guide means on the slide for movement with the slide and relative to the slide and is connected thereto by resilient means. The resilient means urges the shutter into one of two stable rest positions with respect to the slide, in one of which the aperture is closed by the shutter and in the other of which the aperture is open.

The lens means is supported on parallel resilient sheet metal flexures which are connected also to the frame. Actuator means acts upon the composite structure to change the position of the lens means by deflecting the sheet metal flexures and serves to move the lens from a defocus to a focus position and back again. The actuator means may be controlled by timing means in order to permit a limited predetermined time in focus position.

7 Claims, 16 Drawing Figures

PATENTED JAN 28 1975 3,862,799

CONTROLLED-READING DEVICE

The present invention relates to improvements in a controlled-reading projector. These improvements may be used separately or in conjunction with one another, but together advantageously provide a new improved controlled-reading projector.

In the prior art, controlled-reading projectors have been largely modifications of film strip projectors. A highly successful modification providing a controlled-reading projector is shown in U.S. Letters Pat. No. 2,745,313, wherein diametrically opposed helical grooves cut into a tubular member served to provide an effective moving aperture for a conventional film strip projector using a special power takeoff to drive the tubular element.

The present invention provides a controlled-reading projector which is designed specifically for the purpose, rather than being an adaptation of another projector. As such it provides features which may be useful in other applications, but which are particularly desirable for educational purposes where easily handled, easily operated, simple, easily repairable structures are very much to be desired. The projector of the present invention also permits the use of a film cassette for ease in handling and fool-proof operation. The cassette and projector are designed to use smaller film sizes and, therefore, to provide more information in smaller space and much more information within a cassette than had previously been available in much longer film strips. The present invention also provides accurate, easy-loading of the projector with good precision and film perforation alignment so that the user never has to be concerned about matching perforations with the sprocket wheel. The projector also provides an intermittent drive of simple construction and a novel apertured slide through which a portion of a line may be projected and which may be moved across the line at a preselected speed, which is easily coordinated and interconnected with the intermittent drive of the sprocket wheel. The slide also provides a shutter which is automatically actuated to close the aperture during return of the slide, and open the aperture during a reading traverse, using simple, effective, mechanical means. The projector also provides a very simple effect focus-defocus control with an actuator which may be provided with electrical timing circuit to bring the subject matter on a film into focus for a precise, predetermined period of time, the time being selected by pushbutton switching means.

More specifically, in accordance with the present invention a film cassette is provided by elongated hollow box of standardized fixed dimensions to contain a continuous loop or strip of film having sprocket perforations for advancing the film. The loop extends around guides within said hollow box near opposite ends thereof, is twisted at 90° in at least two places and is resiliently biased into a taut loop. Film guides hold the position of the film which has been twisted in line with and generally perpendicular to the lens axis along which the cassette walls are removed to permit projection of the film and also hold the film in position opposite an opening in the casing through which a sprocket wheel drive projects to drive the film by its perforation. Positive film drive and proper alignment is possible because the cassette is positioned and held fixed with regard to the projector and the film in the cassette is resiliently urged into a taut loop. The taut loop causes the film to align with the projection aperture plate and to conform to and assure positive engagement with the sprocket wheel, both of which projector components have entered the cassette for such engagement.

The projector which is subject to improvements always includes a suitable frame, a lamp, lens means and film holder arranged relative to one another for projecting images of written material on film means in the film holder. More specifically, one improvement in the projector of this description involves a film holding cassette of the type described, having a predetermined cross-sectional form and having at least one positioning element at a predetermined position along its length. The guide for receiving the elongated cassette is shaped so that its cross-sectional form will determine a unique orientation for the cassette within the guide. The guide itself is pivotal away from the sprocket wheel for loading, and pivotal back into the sprocket wheel for operation. Corresponding position-engaging means is provided on the frame to cooperate with the positioning element on the cassette, to precisely locate the cassette within the guide means once the guide is pivotted into the sprocket-wheel-engaging position, in which the sprocket wheel will be engaged with the film perforations through the opening in the cassette. Releasable latch means on the frame holds the guide means in operating position.

Another specific improvement in projectors according to the present invention is a sprocket wheel drive for intermittently advancing the perforated film. A ratchet wheel drives the sprocket wheel and a pawl intermittently engages the ratchet wheel to drive the sprocket wheel. Motor means drives a cam providing a discontinuity, and a cam follower operating on said cam through suitable linkage to the pawl moves the pawl into engagement position slowly and then as the follower passes the discontinuity in the cam rapidly moves the pawl causing the ratchet to move a step.

Another specific improvement in projection means is a movable opaque slide having an aperture through which only a portion of a line of writing may be projected. A slide support on the support frame movably supports and guides the slide along a straight line path which enables the successive portions of an entire line to be viewed in reading sequence. Cam means defines the travel of the slide and spring means urges the slide toward the cam means. Drive means causes the cam means to move the slide periodically in opposition to the spring from said one end of travel to an opposite end and then, at a cam discontinuity, allows the slide to quickly return to said one end under the urging of the spring means.

A further specific improvement in accordance with the present invention involves a slide having an aperature as described and movable such a way as to cause successive portions of the entire line to be viewed in reading sequence. A shutter is movably supported by guide means on the slide for movement with the slide and relative to the slide. Resilient means interconnects the slide and the shutter and urges the shutter into one of two stable rest positions with respect to the slide. In one of the positions, the aperture is closed by the shutter and in the other, the aperture is open. Actuator means on the shutter moves the shutter relative to the slide from one position to the other when stop means on the frame along the path of movement of the slide engage the actuator means to drive the shutter into its other stable position.

Still another improvement in the projector in accordance with the present invention involves the provision of parallel resilient sheet metal flexures connecting spaced points on the lens means and similarly spaced points on the frame. Actuator means operates upon the composite structure to change the position of the lens means by deflection of the sheet metal flexures and serves to move the lens from a defocus position and back again. The actuator means is preferably provided with timing means which causes the lens to remain in a focus position a predetermined time. The timing means through suitable conventional timing circuits and selection switches may select various times for holding the lens means in focus.

For a better understanding of the present invention reference is made to the following drawings in which FIG. 1 is a perspective drawing of a preferred embodiment of a projector in accordance with the present invention with the cassette in position for operation;

Figure 1:
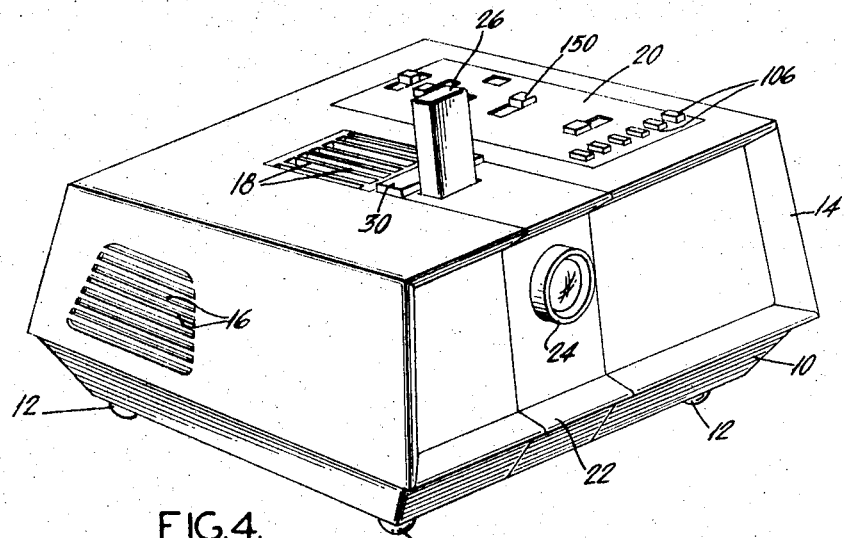
Figure 2:
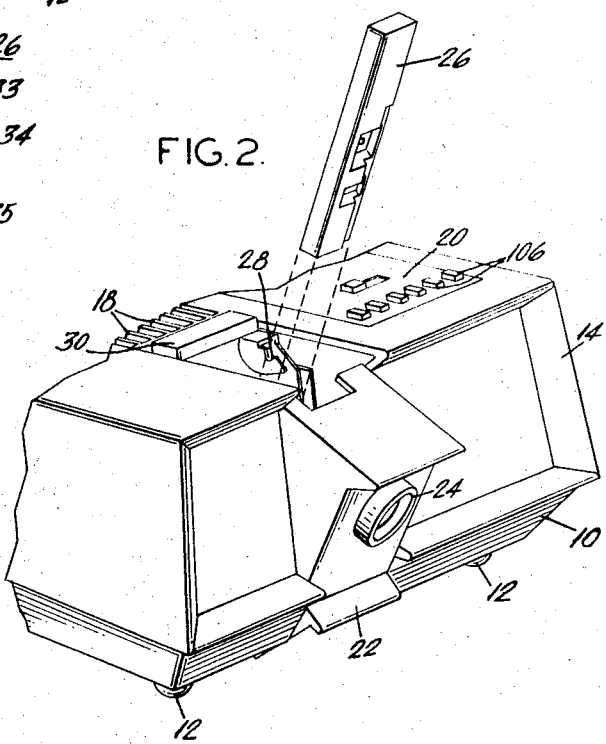
FIG. 2 is a partial perspective view of the same projector showing the film cassette guide open and the cassette removed.

Referring first to FIGS. 1 and 2, the improved controlled-reading projector of the present invention is shown as it would be seen in normal use. As appears in FIGS. 1 and 2, the projector has an inverted truncated pyramidal base 10, provided with suitable foot pads 12. The structure is mounted on the base following which a cover 14, also of truncated pyramidal form, is placed in position to conceal the internal construction. Suitable louvers 16 and 18 may be provided adjacent the blower and projection lamp locations respectively. A control panel generally designated 20 is provided at one side on the top within which are group operational pushbuttons and actuators which will be described herein in connection with their uses for control of the projector. A separate lens housing 22 conforming to the base 10 and cover 14 to provide a smooth contour when in place as shown in FIG. 1, is pivotally connected to the base 10 to permit its forward rotation as shown in FIG. 2. A lens 24 extends beyond the cover and is rotatable to effect the focus. A generally vertically extending film cassette guide 84 (see FIGS. 2 and 7) is located immediately behind the lens housing and also is pivotally supported on the projector base 10 by separate hinging means. When the lens housing is moved to the position shown in FIG. 2, the guide also tends to move forward into a position in which the film cassette, generally designated 26, may be readily removed or readily inserted, or reinserted for use. The cassette is properly placed in the guide by simply inserting the cassette in proper orientation within the guide 84 and allowing it to fall by gravity into place. The lens housing may then be moved back into the position of FIG. 1, moving the guide means with it and positioning the cassette in the operating position shown in FIG. 1. Latching means 28, supported on the frame to which the cover is connected, engages catch means on the lens housing 22 and thus holds the lens housing and cassette guide latched into the position of FIG. 1 until the latch is released by pressing release button 30 to permit the lens housing 22 and the cassette guide 84 to again move forward.

Figure 3:
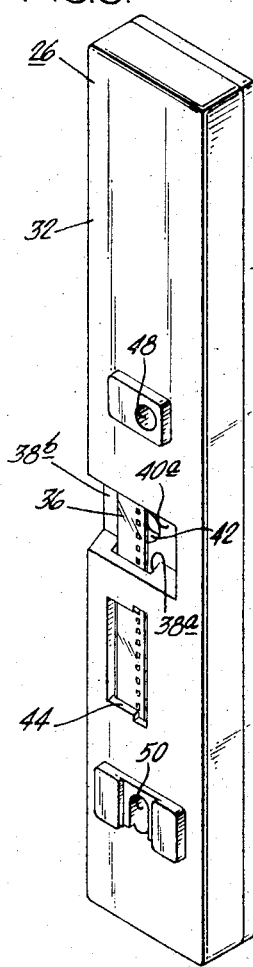
FIG. 3 is a perspective view of the film cassette of the present invention from the sprocket-engaging side.
Figure 4:
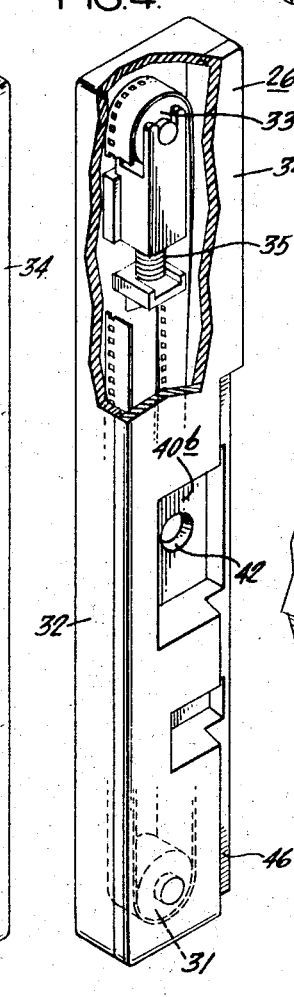
FIG. 4 is a perspective view of the cassette of the present invention from the opposite side, partially broken away to show a portion of its interior structure.
Figure 9:
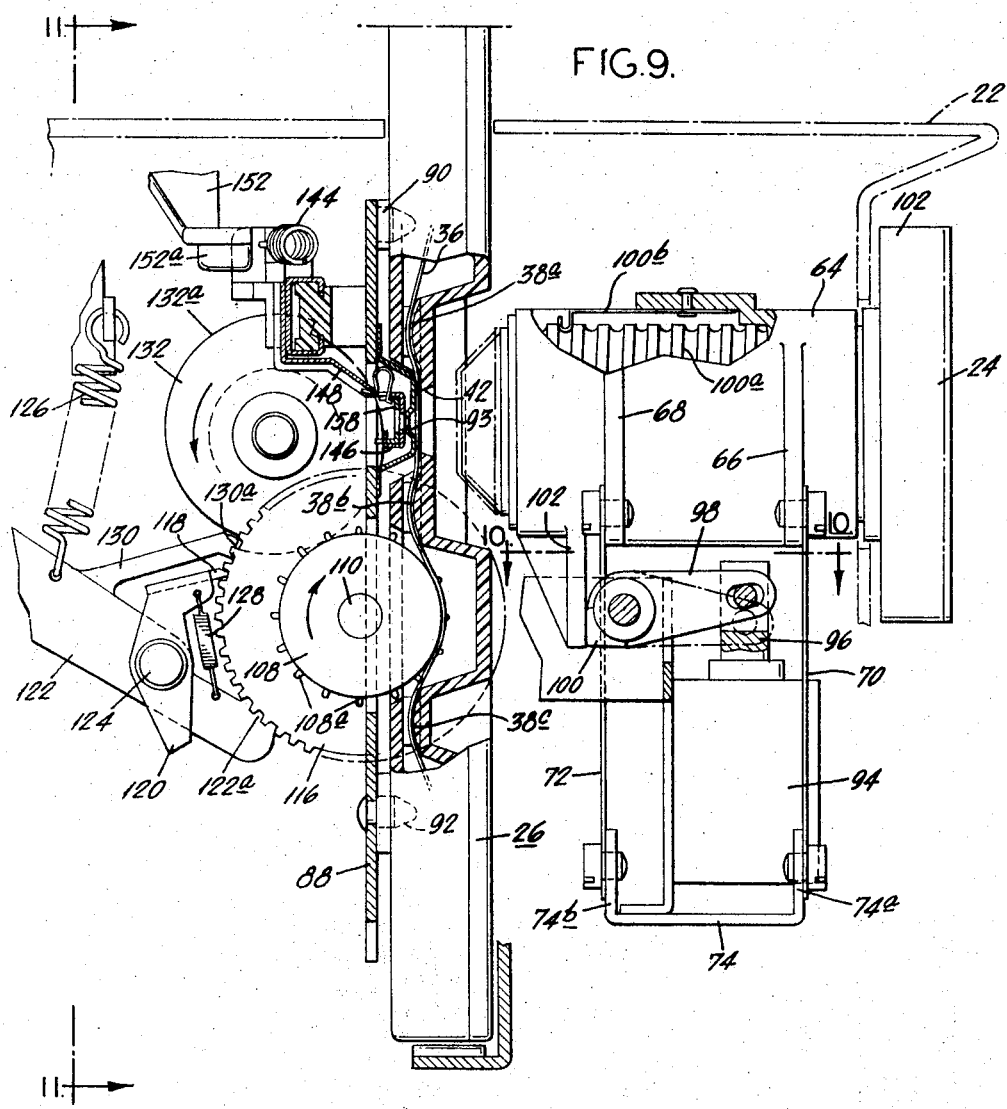
FIG. 9 is a sectional view taken along line 9—9 of FIG. 5, with the cover and lens housing shown in broken lines.

A preferred embodiment of cassette is shown in FIGS. 3 and 4 which clearly show that the cassette 26 is an elongated housing, in this case composed of pieces 32 and 34, which together provide a cavity in which a continuous loop of film 36 is located. The film is preferably of a super-8mm size, rather than the 35mm film commonly used with film strip projector and this allows the same amount of information to placed on a smaller amount of film. The film loop passes over guides which may consist of rollers 31, 33 near the opposite ends of the hollow casing. One of the rollers 33 is movable and spring-tensioned using compression spring 35 to preserve tautness in the loop. In at least one of the runs of the loop, the run is twisted approximately 90° about the film axis to rotate the face of the film into the plane of the loop. Ordinarily the cassette has a thickness corresponding to the width of the film. The portion of the film which is twisted at 90° is preserved in this orientation over one or more frames of the film by film guides. The film guides consist of channel-shaped portions molded into the housing which channels confine the edges of the film and provide a curved base contacting the film on the inside of the loop to provide a reference relative to which the film may be inwardly displaced by structure pressing inwardly from outside the loop. The rounded bottoms of film guides 38a, 38b and 38c may best be seen in FIG. 9. In the twisted plane defined by these guides the film is located in line with and generally perpendicular to the axis of projection. Along the lens axis the housing is cut away with opposed recesses 40a and 40b connected by an intermediate aperture 42 sufficient to permit the projection of an image therethrough. Similarly, another portion of the film is exposed in an opening 44, which is designed to be of such dimension as to accommodate a driving sprocket wheel which engages the sprocket perforations in the film within that opening. As shown in FIG. 9, the film guides 38b and 39c each of the opening hold the film in place. The loop yields as the sprocket wheel engages with the film perforations and that engagement is made firm by resistance of the resilient spring means 35, tensioning the loop.

Figure 6:
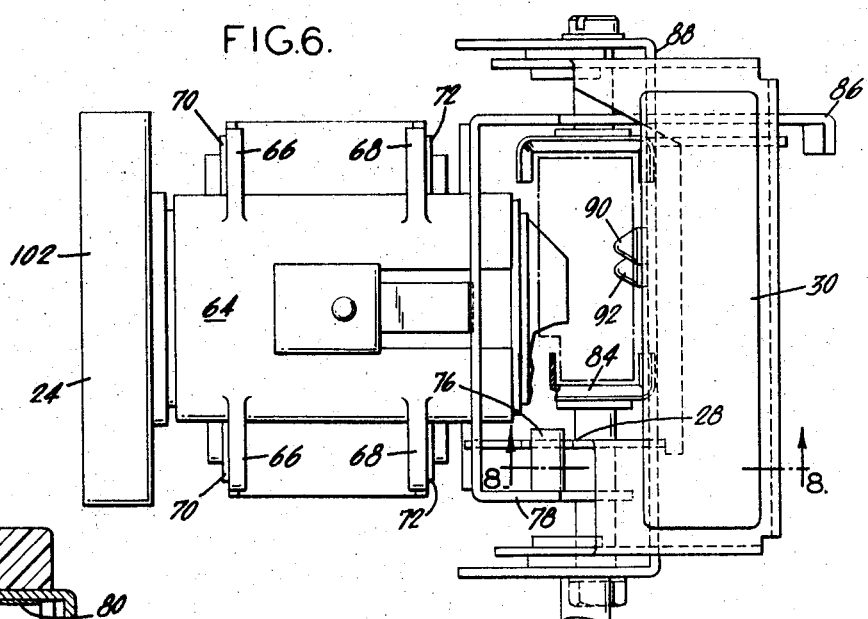
FIG. 6 is a plan view from above with the cover removed showing the lens and cassette guide structures.
Figure 7:
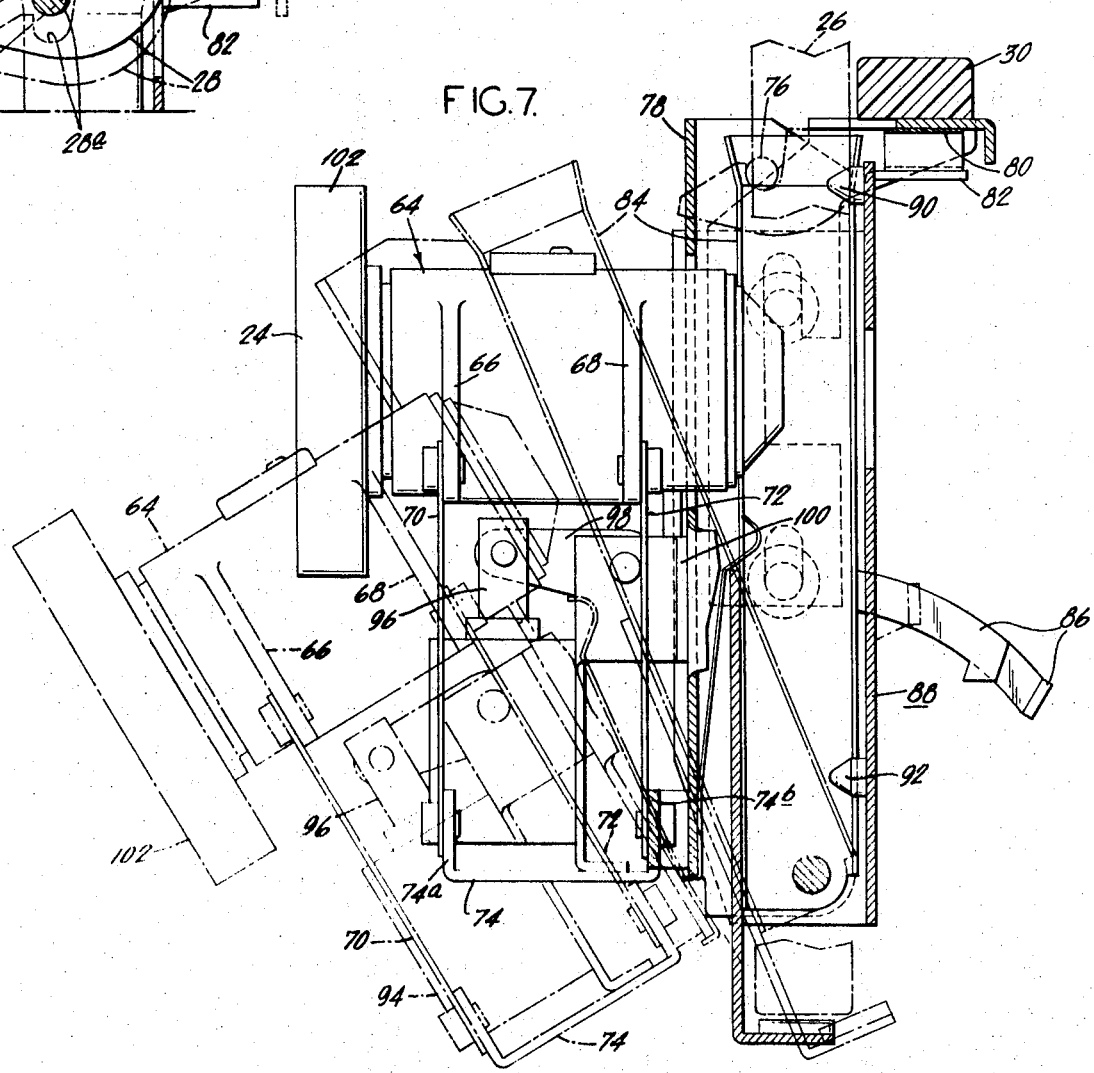
FIG. 7 is a side elevational view showing the operation of the film guide and associated structure in closed position with the open position of the same structure shown in dot-and-dashed lines.

The cassette 26 is also provided with a unique cross-sectional shape to put the guide means in that unique orientation which will cause it to cooperate properly with the projector. It will be noted that in the embodiment of FIG. 4 one corner is cut away and an inverted inside corner channel 46 provided. As best seen in FIG. 6 one side channel of the guide means 84 has been shortened to provide a guide conforming to the cross-section of the cassette in proper orientation. To prevent the cassette from being inserted up-side-down, the channel 46 runs only part way up the length of the cassette. The conforming guide prevents the cassette from being inserted when right side up in any other orientation. It will be clear however, that the guide need not conform exactly in order to accomplish this purpose, and, for example, might simply provide a bevelled wall cutting across the corner corresponding to the channelled corner of the cassette. Cassettes of other shapes and forms might of course be made to conform to a guide means of selected form in other embodiments. Furthermore, as shown in FIGS. 6, 7 and 9, positioning guide holes 48 and 50 in the cassette (in locations seen in FIG. 3) are provided to receive guide pins 90 and 92 which project from the housing and align the cassette properly within the guide means 84 to properly mesh with the sprocket wheel and properly align the film with the aperture plate 93.

Figure 5:
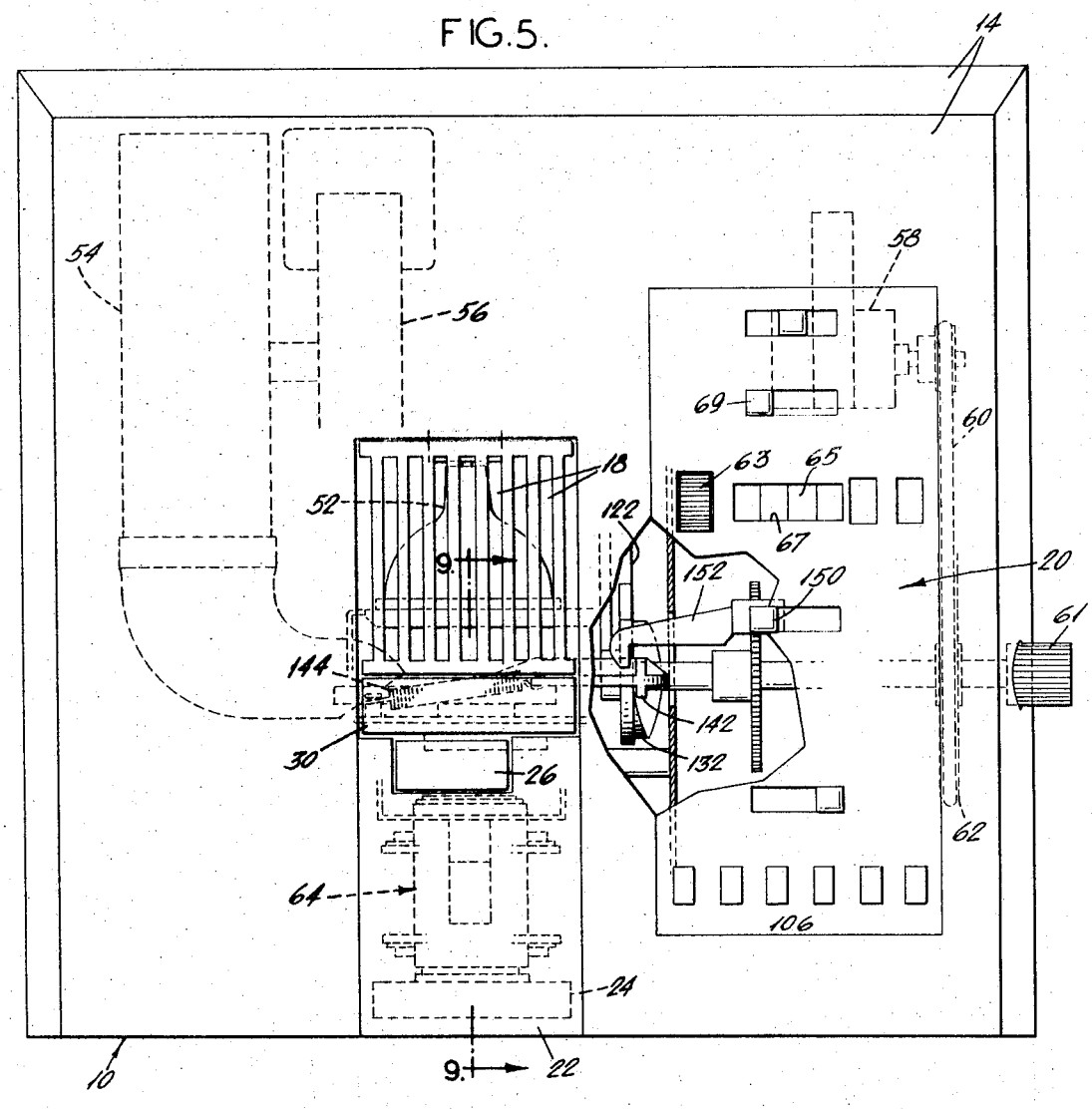
FIG. 5 is a plan view from above of the projector structure in accordance with the present invention, showing part of the structure broken away to show the slide-moving mechanism and showing some of the controls in full plan and some of the structural orientation within the casing in dashed lines.

Referring to FIG. 5 the plan view from above shows much of the structure shown in FIGS. 1 and 2 and additionally shows, in phantom lines, standard structure of a projector as adapted to this particular improved controlled reading projector. In particular lamp 52, blower 54, drive motor 56 for said blower and associated duct work are shown. Similarly adjustable speed motor means 58 providing drive through pulleys and belt 60 to a system of control gears driven by pulley 62 operates the apertured slide and shutter and the intermittently moving sprocket wheel to drive the film. Motor speed is selected by knob 63 the knurled edge of which is exposed through a slot in the top cover for finger tip rotation. Associated with knob 63 is calibrated drum 65 bearing adjacent columns of numbers which are displayed through an elongated slot 67 in the cover to show comparable word rates per minute for various numbers of words per line shown on the cover at the corresponding column on the drum. The calibration is such that for a motor speed selected by knob 63 the figures on the drum 65 displayed in the slot 67 indicate the words per minute for a range of words per line. Therefore, if the words per line are known for a given cassette film, the words per minute displayed and read by the student will be directly readable from the drum. A dual speed transmission operated by shift lever 69 is provided to permit selection of various speed ranges. Calibration of words per minute must, therefore, provide alternative scales for various possible speed ranges. An auxiliary manual drive is provided by a thumb wheel 61 projecting from the cover 14.

Figure 8:
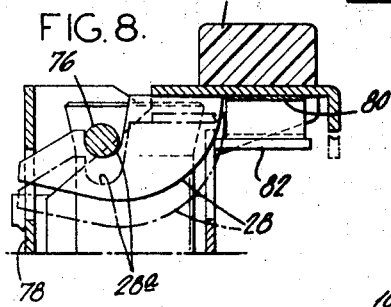
FIG. 8 is a detailed sectional view taken along line 8—8 of FIG. 6.

Details of the latch are shown in FIG. 8 in full lines in engaged position, and in dot-dash lines in release position. As seen in that figure, a groove 28a engages a latch pin 76 on the front of the frame structure 78, attached to the lens housing. As seen in FIG. 8 the latch member 28 is an extension of the actuator 30, which is normally urged upwardly by a leaf spring 80 away from a sheet metal member 82 attached to the housing. When the actuator 30 is depressed the latch member is moved downwardly to the dot-dash position in FIG. 8, thus releasing the latch pin 76 and allowing the lens housing 22, and the lens mount 64 contained therein as seen in FIG. 7, to move from the solid line position to the dot-dash position shown in that figure. At the same time, the guide means 84, which is preferably in the form of opposed U-channels having an open top, and conforming to the shape of the cassette, moves away from the sprocket engaging position shown in full lines to the cassette-removing or - inserting position shown in dot-dash lines. Preferably also, the housing is provided with stop means 86, which eventually engages a vertical wall 88 forming part of the frame to limit the forward or outward motion of the lens housing and the cassette guide. The conical pins 90 and 92, also shown on frame member 88 are the mating positioning members entering guide holes 48 and 50 to establish alignment of the cassette when the guide means 84 is raised to the solid line position. These pins engage the guide holes 48 and 50 as the guide means is closed into the operative position and the conical shape of the pins insure that by the time the guide means is fully closed the sprocket wheel 108 engages in the perforations in the film and the aperture plate 93 is properly oriented with respect to the film.

Within the lens housing and movable therewith, is a generally standard lens system 24 in lens mount 64, which, however, is supported on the lens housing and hence on the frame when in latched position, in a novel and improved way. Specifically as shown in FIGS. 5, 7 and 9 the lens mount is provided with parallel lugs 66 and 68 to which are connected resilient sheet metal flexures 70 and 72. These flexures are arranged parallel to one another and are fixed at their opposite ends to the legs 74a and 74b of U-shaped bracket 74. Bracket 74, in turn, is fixed to the lens housing and may be considered part of the frame, at least when the lens housing is connected rigidly thereto by the latch 28.

Figure 10:
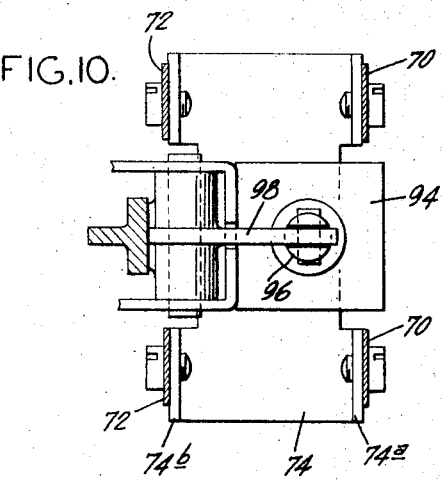
FIG. 10 is a sectional view taken along line 10—10 of FIG. 9.

Now considering the projector lens 24 contained within the lens mount 64, it will be observed in FIGS. 9 and 10 that a solenoid actuator means 94 is provided on the bracket 74 so as to preserve its orientation with respect to the lens housing. Solenoid 94 drives plunger 96 which through suitable linkage 98 acts upon the lens mount 64 to move the lens axially from the position shown to a position rearward of that position. It is possible to focus and defocus lens 24 by rotating ring 102 thereof. Helical thread 100a on lens 24 and flexible thread guide 100b on lens mount 64 causes the lens to translate toward or away from the film as the result of such rotation. By this means the lens 24 is arranged so that the image is out of focus in one position, preferably the deenergized position of the solenoid, and the image is in focus in the energized position of the solenoid. It is then possible, by connecting the solenoid into timing circuits, to time the period for which the solenoid is engaged and hence the time when the image is in focus, so that an observer will have a specified limited time to read, or observe the projected image. A row of selector switch pushbuttons 106 may be used to actuate certain predetermined RC timing circuits to achieve selected "on" time of the solenoid for this purpose. The solenoid achieves this novel result by this simple expedient due to the construction of the resilient parallel flexure support on the lens.

Figure 11:
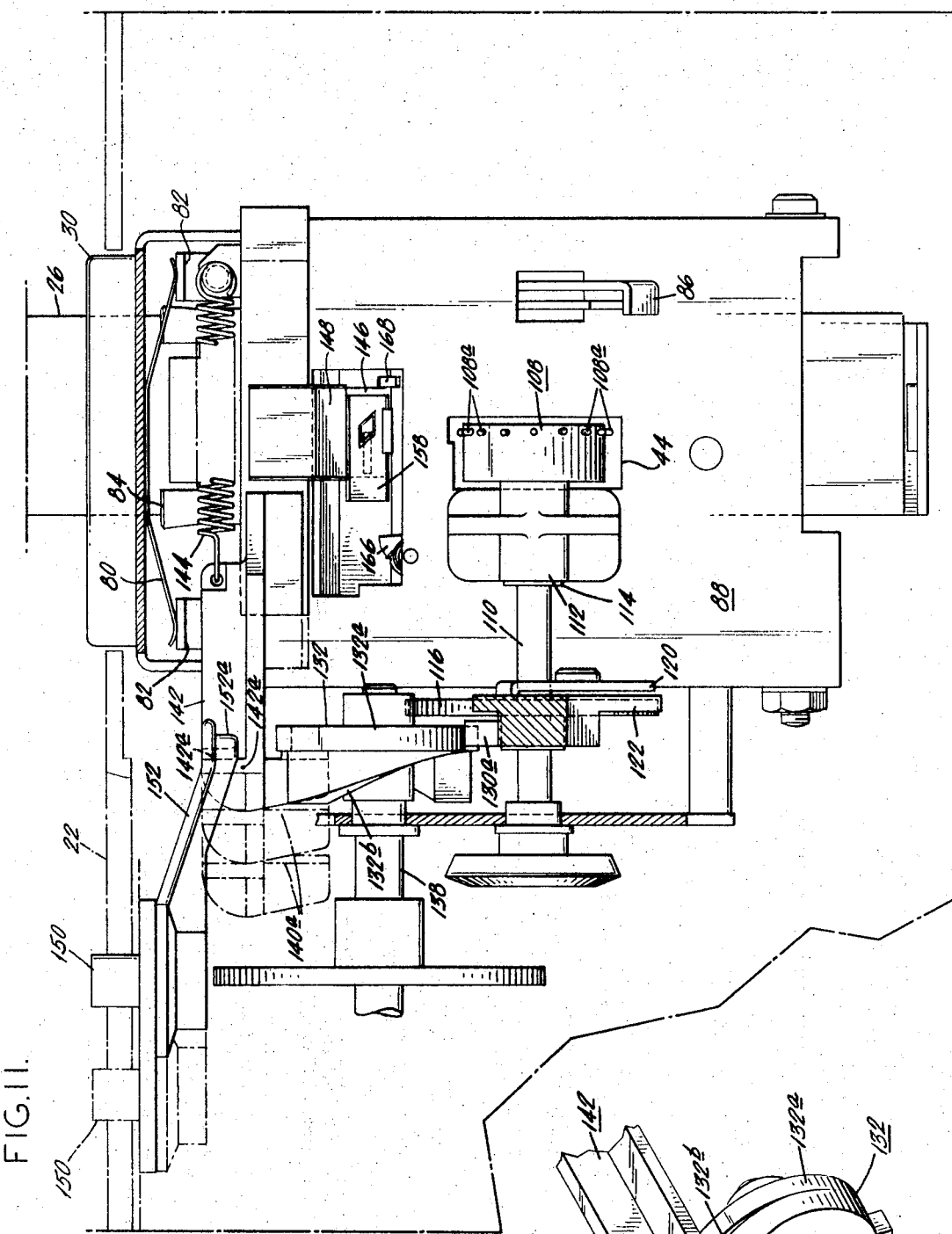
FIG. 11 is a sectional view taken along line 11—11 of FIG. 9.

Because the drive system and the gearing in the gear box is largely conventional, much of the interconnection between the motor 58 and the drive system is omitted and only so much is shown to give an understanding of the operation and novel parts of the system. The sprocket wheel previously referred to is best seen in FIGS. 9 and 11 as wheel 108 having sprocket teeth 108a arranged around its periphery. The sprocket wheel 108 is supported on a shaft 110 which may be provided with a bearing 112 supported on wall 88 of the support frame. Shaft 110 also support toothed ratchet wheel 116 which, as best seen in FIG. 9, is intermittently engaged and driven by pawl 118. Pawl 118 is an integral part of lever 120 which is supported to linkage 122 by pivot 124. Linkage 122 is pivotally supported at its remote end (not shown), to some portion of the frame structure. At its opposite end it is provided with teeth which normally engage the ratchet wheel 116 and insure positive indexing at specified angular positions. It is normally held in such engagement by spring member 126 connected between it and the frame. The pawl 118 is held engaged because of a spring connection between its lever 120 and linkage 122, provided by spring 128. The linkage is provided with an offset arm 130, the end 130a of which serves as a cam follower of the outside peripheral cam surface 132a of cam wheel 132 (see FIG. 12), which rotates in the direction shown by the arrow in FIG. 9 as a result of appropriate connection to the motor drive means 58. In the position shown, the cam is follower 130a just past a discontinuity. At a predetermined place along the track of cam 132a the teeth 122a on the end of linkage of 122 will disengage the teeth of the ratchet wheel 116. Subsequently as the cam follower 130a passes the discontinuity in the cam pawl 118 will move the ratchet wheel one notch and the teeth 122a will immediately reengage. Thus each one-half revolution of the cam 132, the ratchet wheel is advanced an amount corresponding to one tooth on the ratchet wheel 116 and the sprocket wheel is correspondingly advanced, thereby advancing the film in the film cassette by that amount, which corresponds to a line of print.

In connection with FIG. 9 it should be observed that when the cassette 26 is in the position shown, the sprocket wheel 108 actually enters the cassette and deflects the film against tension provided for the loop within the cassette in order to give positive drive. Similarly, aperture plate 93 enters the recess 40a along the lens axis and holds the film in aligned position so that the film will be in a fixed plane at all times during projection.

Figure 12:
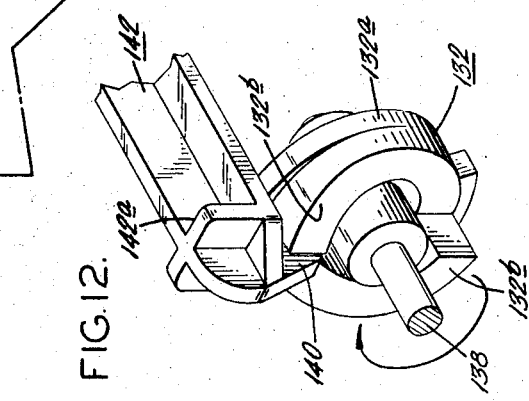
FIG. 12 is a perspective view of a double-cam actuator structure, the cam surfaces of which control respectively the movement of the apertured slide and the intermittent movement of the ratchet driving the sprocket wheel.
Figure 14:
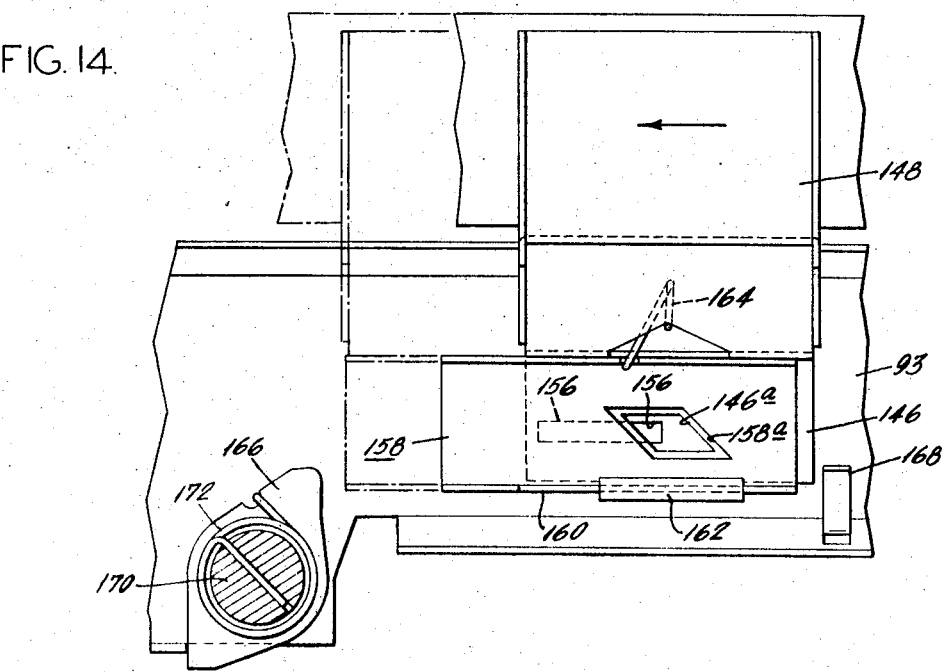
FIGS. 14, 15 and 16 are similar views showing the slide and shutter in different operating positions.
Figure 15:
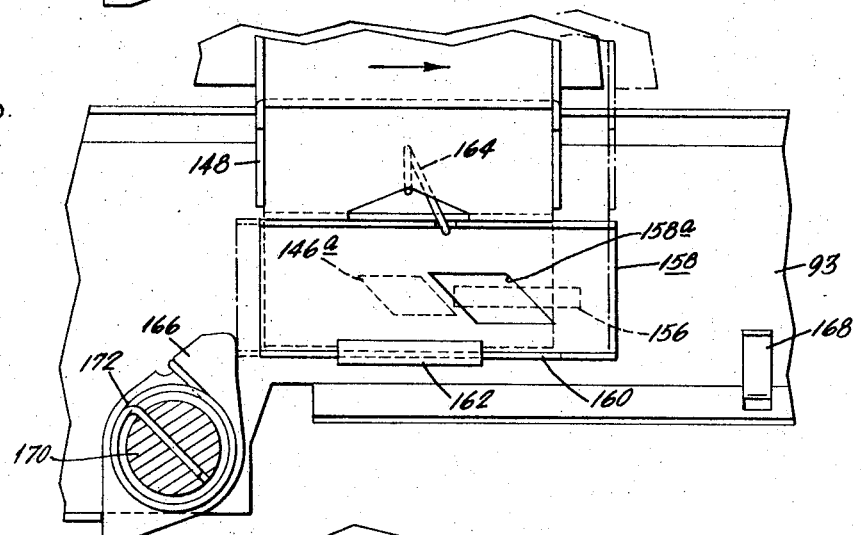
Figure 16:
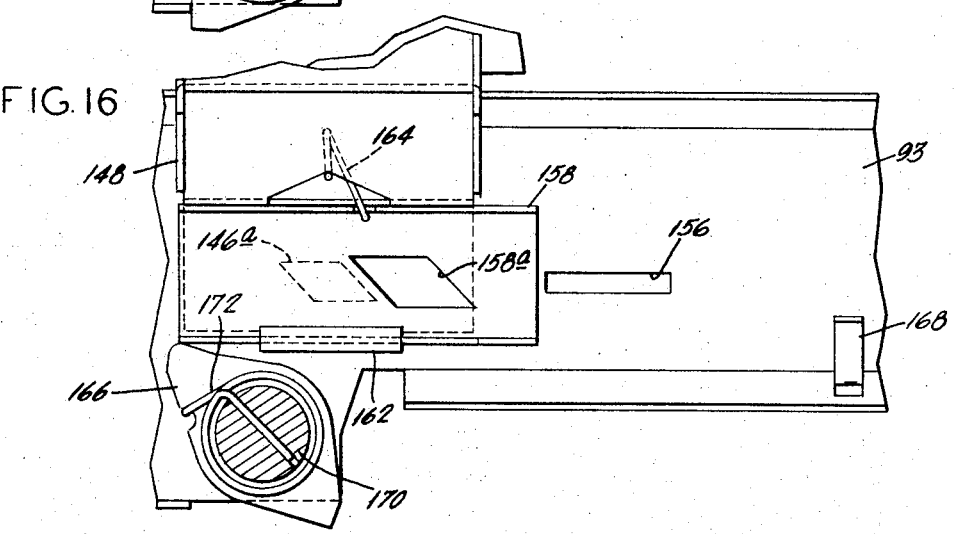

As shown in FIG. 12, the cam 132 in addition to having two peripheral cam surfaces spaced 180° apart, also has two face cam surfaces 132b similarly spaced 180° apart and also concentric with the drive shaft 138. This face cam surface is used to actuate a face-cam follower 140 on slide actuator 142 in its ordinary position shown in the two positions to the right in FIG. 11 represented by the extreme positions of the face cam surface. These slide positions are also shown in FIGS. 14 and 15. The cam follower when used acts against the face cam surface by a spring 144 connected between the frame and the slide actuator. The apertured slide 146 is connected to the slide actuator by intermediate support means 148 and when controlled by the face cam surface 132b moves between two positions determined by the displacement afforded by the face cam surface. Selector means 150, which as seen in FIG. 5, projects through the cover 22 allows the slide to be positioned so that the cam is effective to displace the slide back and forth between the positions shown in FIGS. 14 and 15 or so that the slide is removed entirely from the axis of projection, as shown in FIG. 16. This is accomplished by moving the actuator 150 to the right, as shown in FIG. 5, and through the intermediate connection means 152 and a shoulder 152a thereon which engages an opposed shoulder 142a on the slide actuator 142. In moving the member 150 to the right in FIG. 5, or to the left in FIG. 11, a detent is provided at each extreme to overcome the tendency of spring 144 to pull the cam follower 140 back into contact with cam 132b and the slide is in a position known as park, illustrated in FIG. 16 wherein the slide is completely removed from the projection opening 156 in aperture plate 93. FIGS. 14, 15 and 16 show an enlarged view of the slide, and will be referred to in greater detail with regard to operation after a brief description of the structure of FIG. 13.

Figure 13:
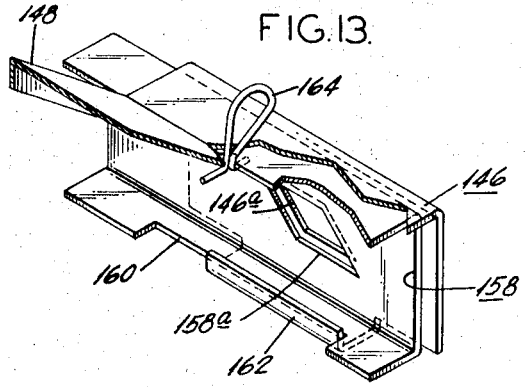
FIG. 13 is a fragmentary perspective view of the apertured slide and its associated shutter construction.

Referring to FIG. 13 slide 146 is provided with an aperture 146a in its opaque surface which limits projection to only a portion of a line being projected at one time. The slide is moved along the line by the effect of the face cam 132b as it gradually moves the cam follower 140 in opposition to spring 144. When a discontinuity in the cam is reached spring 144 rapidly pulls the slide 146 back to starting position. Preferably there is also provided in connection with the slide, a shutter member 158 having aperture 158a corresponding to, and preferably somewhat larger than aperture 146a in slide 146. Shutter 158 is preferably a channel-shaped member fitting within the channel-shaped portion of slide 146, having a slot 160 cut from the edge toward the web of one of the legs of the channel, the shoulders of which provide end stops to limit relative movement between the shutter and the slide due to the projection of shoulder flange 162 into the slot 160. Flange 162 may be folded out of the short leg of the lower channel side wall of slide 146. The upper channel side wall of the shutter 158 and the slide are then connected together by a resilient spring, or coupling member 164, which acts as an over-center actuator. Thus the shutter and slide have two stable positions as determined by spring 164, one in which the apertures 164a and 158a coincide as shown in FIG. 13 and one in which flange 162 is stopped at the other end of the slide 160 wherein the shutter has completely closed off the aperture. It will be noted that in the position shown in FIG. 14, the shutter extends to the left of the slide and the slide to the right of the shutter. This is precisely the start position shown in FIG. 14 which will now be referred to to explain the operation of the shutter. As seen in FIG. 14, the slide is being driven to the left through its cam actuator. As will be observed in the dot and dash lines as the combined structure moves to the left the shutter will first contact the movable stop 166, upon which occurrence the slide continues to drive while the shutter is stopped, thereby causing the shutter to push the spring 164 over center into the position shown in FIG. 15, which illustrates the condition at the end of the traverse when the slide is moving back to the right. At this position the shutter has snapped closed and the movement to the right is extremely rapid as the spring 144 controls the movement rather than the cam 132. Shortly thereafter the leading edge of the shutter 158 will strike the fixed stop 168 while the slide continues to move and thus cause the spring 164 to move over center, again superimposing the apertures 146a and 158a, as shown in FIG. 14, for the relatively slow traverse during the reading portion of the projection cycle.

FIG. 16 shows what occurs when the handle 150 shown in FIG. 11 is pulled from the position shown in full lines to the position shown in dashed lines and thereby pulls the whole slide assembly to the left, as shown in FIG. 16, to a point where it clears the aperture 156 completely. In doing this, the movable stop 166 is rotated out of the way about its post 170 and against the action of its spring 172. Spring 172 is of sufficiently stronger effect to easily overcome the over-center spring 164 without moving. In view of the larger force supplied through handle 150, however, stop 166 may be pushed aside. With the slide in the park position there is no slide action in the projector, which is a condition sometimes desired and would particularly be desired if a whole line where to be flashed for a limited period of time, as described in connection with the structure of FIGS. 9 and 10.

The single preferred embodiment of the present invention has been described in some detail with regard to those parts of the structure which are considered to be new. It will be clear to those skilled in the art that the structures shown are merely representative and that obvious modifications can be made to each of the structures and substitutions will readily occur to one skilled in the art. For example, in connection with the shutter construction it will be clear that a pivoted flap opening and closing an aperture in the slide and having an over-center spring connecting it to the slide would be the equivalent. Such a structure could have an actuator projecting from the shutter to contact fixed stops at opposite ends of the shutter movement, for example, in order to actuate the shutter in much the same way as the shutter described.

Actuators of all sorts of types have equivalent cams and other types of actuators described herein may of course be substituted for by structures providing an equivalent effect. The same is true of other pawl and rachet construction shown. These are typical of the many types of substitution which can be made clearly within the scope of the present invention. Accordingly, all modification of the structure shown and described within the scope of the claims are intended to be within the scope and spirit of the present invention.

I claim:

1. In a projector including, on a suitable frame, a lamp, lens means, and a film holder for holding film means having written material thereon in at least one line, arranged relative to one another for projecting images of said written material, the improvement comprising a movable opaque slide having an aperture through which only a portion of said line may be projected,
a slide support on said frame for movably supporting and guiding said slide along a straight-line path which enables the successive portions of said entire line to be viewed in reading sequence,
slide drive means for moving the slide back and forth along said straight line path,
a shutter movably supported by guide means on the slide for movement both with the slide and relative to the slide,
resilient means interconnecting said slide and said shutter and urging the shutter into one of two stable rest positions with respect to the slide, in one of which positions the aperture is closed by the shutter, and in the other of which positions the aperture is open,
actuator means on said shutter for moving the shutter relative to the slide from one position to the other, and
stop means on the frame along the path of movement of the slide so positioned that as the slide approaches each end of its path of movement the stop means will engage the actuator means and drive the shutter into its other stable position such that the aperture is open as the slide moves in the reading direction and is closed as the slide moves in the opposite direction.

2. The improved projector of claim 1 in which the shutter is a slide member slideably supported on the slide and having an aperture therein which in one position of the shutter coincides with the aperture in the slide and in the other position of the shutter completely closes the slide aperture.

3. The improved projector of claim 2 in which the shutter and slide are nested channel members with suitable means to hold them in slidable relationship to one another.

4. The improved projector of claim 3 in which flange means from one channel fits within and slides between shoulders defining a slot in the other channel member.

5. The improved projector of claim 2 in which the shutter is supported on the slide such that opposite edges of the shutter provide actuator means and a leading edge extending beyond the edge of the slide in the direction of motion in the respective stable positions of said shutter in position to contact fixed stops on the frame to contact the shutter before each end of its movement to cause the shutter to move relative to the slide.

6. The improved projector of claim 5 in which the stop at that end representing the beginning of a line is a spring loaded stop, the spring of which may be overcome to push the stop out of the way as the slide is moved out of its effective range into a park position.

7. In a projector including, on a suitable frame, a lamp, lens means, a film holder for holding a sprocketed film having written material thereon in a plurality of parallel lines, all arranged relative to one another for projecting images of said written material, and a sprocket wheel for advancing said film intermittently, the improvement comprising a movable opaque slide having an aperture through which only a portion of said line may be projected,
a slide support on said support frame for movably supporting and guiding said slide along a straight-line path which enables the successive portions of said entire line to be viewed in reading sequence,
slide drive means for moving the slide back and forth along said straight line path,
a shutter movably supported by guide means on the slide for movement both with the slide and relative to the slide, resilient means interconnecting said slide and said shutter and urging the shutter into one of two stable rest positions with respect to the slide, in one of which positions the aperture is closed by the shutter, and in the other of which positions the aperture is open, actuator means on said shutter for moving the shutter relative to the slide from one position to the other, stop means on the frame along the path of movement of the slide so positioned that as the slide approaches each end of its path of movement the stop means will engage the actuator means and drive the shutter into its other stable position such that the aperture is open as the slide moves in the reading direction and is closed as the slide moves in the opposite direction, and coordinated cam means for driving said slide means and said sprocket wheel to enable viewing of said lines only during the lapses in the intermittent advance of said film.

* * * * *

UNITED STATES PATENT OFFICE
CERTIFICATE OF CORRECTION

Patent No. 3,862,799      Dated January 28, 1975

Inventor(s) Elliott P. Smith and Robert H. Wachsmuth

It is certified that error appears in the above-identified patent and that said Letters Patent are hereby corrected as shown below:

In the abstract, between lines 10 and 11, insert the following paragraph: --The sprocket drive wheel is driven by a ratchet wheel intermittently engaged and moved by a pawl.--;

Column 4, line 42, after "to" insert --be--;

Column 5, line 5, "39c" should be --38c--;

line 5, after "each" insert --side--;

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*